F. R. PACKHAM.
CLUTCH MECHANISM.
APPLICATION FILED AUG. 19, 1911.
1,023,221.
Patented Apr. 16, 1912.
2 SHEETS—SHEET 2.
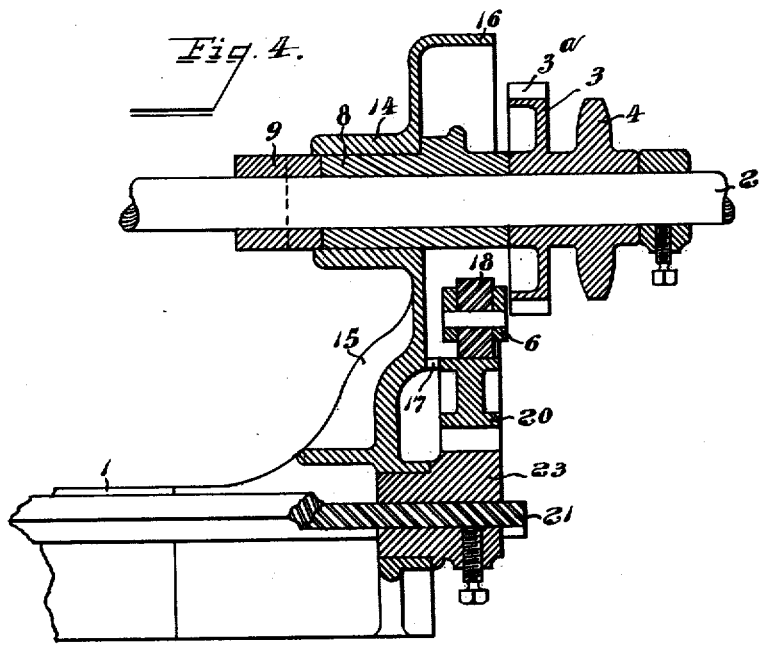
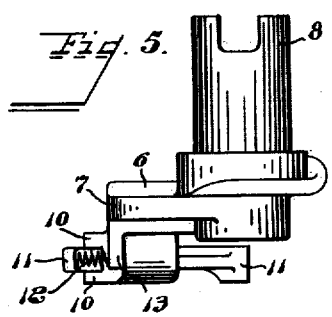
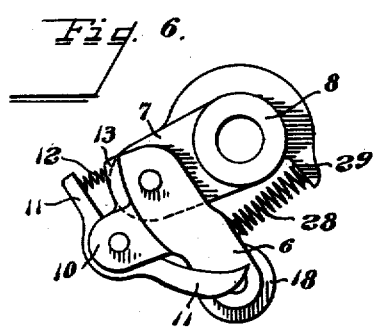

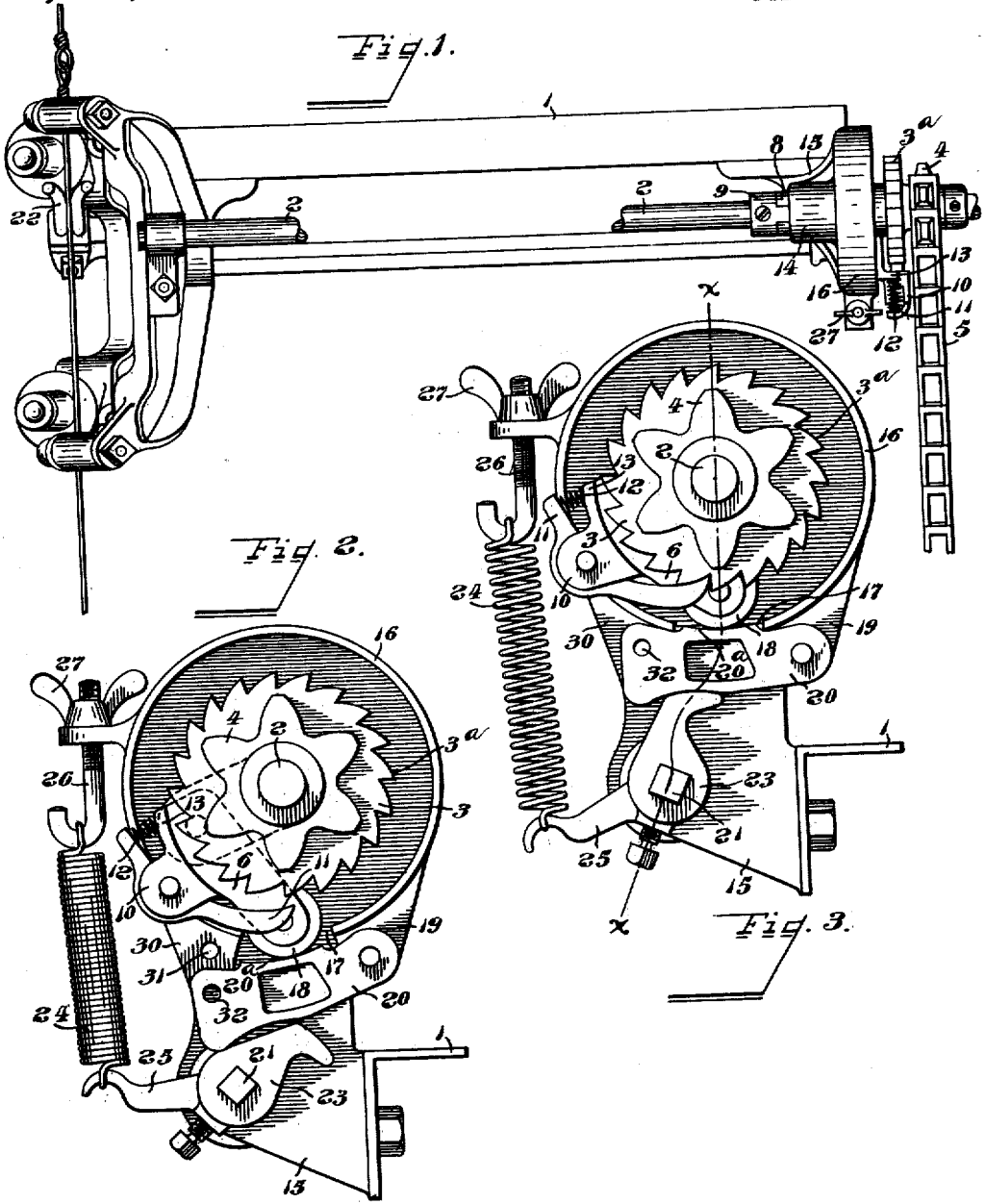

UNITED STATES PATENT OFFICE.

FRANK R. PACKHAM, OF SPRINGFIELD, OHIO, ASSIGNOR TO THE AMERICAN SEEDING MACHINE COMPANY, OF SPRINGFIELD, OHIO, A CORPORATION OF OHIO.

CLUTCH MECHANISM.

1,023,221.      Specification of Letters Patent.      Patented Apr. 16, 1912.

Application filed August 19, 1911. Serial No. 644,944.

*To all whom it may concern:*

Be it known that I, FRANK R. PACKHAM, a citizen of the United States, residing at Springfield, in the county of Clark and State of Ohio, have invented certain new and useful Improvements in Clutch Mechanism, of which the following is a specification.

My invention relates to improvements in clutch mechanism, and it relates more particularly to the devices for operating the seed plates of corn planters, especially in that class of corn planters in which the seeding devices are operated from the axle of the carrying wheels.

An object of my invention is to provide an improved start and stop mechanism for the seeding devices which will be simple in construction and effective in operation.

A further object of my invention is to provide, in that type of start and stop mechanism in which a swinging pawl arm is employed which is thrown into engagement intermittently with a continuously rotating ratchet wheel, a construction by which the pawl will be thrown into engagement with teeth which are located on the outer periphery of the ratchet wheel instead of on the side or face of the wheel to obviate lateral strain on the parts.

A further object of my invention is to provide, in that type of stop and start mechanism in which the pawl arm travels around a path or race-way in which is located an opening or recess into which the pawl drops at the end of one complete revolution, a construction by which the pawl will be assisted in disengaging itself from the continuously rotating ratchet wheel by centrifugal force.

A further object of my invention is to provide for closing the opening or recess in the track by a switch which may be operated either automatically from the check-row devices or independently by foot or hand levers; a still further object being to provide for closing said opening or recess permanently by said switch when the device is used for drilling.

A further object of my invention is to provide a track or race-way for the swinging pawl arm which will be substantially concentric with the axis of the feed shaft and so arranged that the pawl will travel about the inner periphery of said track.

In the accompanying drawings:—Figure 1 is a top plan view of so much of a corn planter as shows my improved devices. Fig. 2 is an end view showing the devices in inoperative position. Fig. 3 is an end view showing the devices in operative position. Fig. 4 is a section on the line $x$—$x$ of Fig. 3. Fig. 5 is a top plan view of the swinging pawl or dog and its connections. Fig. 6 is an end view of the same.

Like parts are represented by similar characters of reference in the several views.

In the said drawings, 1 represents a portion of the frame of the machine upon which are located the operating parts.

2 is the usual feed shaft, which extends transversely across the machine, and is geared to the seed plates in the respective hoppers (not shown). Loosely journaled upon the shaft 2 is a ratchet wheel 3, which is continuously rotated from the axle of the carrying wheels through the medium of the sprocket wheel 4 formed integrally with the ratchet wheel, and the chain 5, as is usual in corn planters of the type to which these devices relate.

Located adjacent the ratchet wheel 3 is a swinging arm 6, the inner end of which is pivotally connected with a lug or ear 7 formed integrally with a sleeve 8, which sleeve is loose on the shaft 2 but is rotatably connected therewith by a tongue and groove connection formed, respectively, in the sleeve 8 and a collar 9 secured to said shaft 2 by a set-screw, as shown in Fig. 1.

Pivoted in off-set ears 10, on the arm 6, is a pawl 11. The outer free end of this pawl 11 stands in line with the teeth of the ratchet wheel 3 and the pawl is preferably of the well known ratchet type, being normally spring-pressed to engaging position with said teeth by a coil-spring 12 interposed between the inner end of said pawl and a lug 13 formed on the inner end of said arm, so that in the event of the pawl striking against the outer end of a tooth when being thrown to engaging position, it will yield against the tension of its spring until the tooth has passed.

The sleeve 8 to which the swinging arm 6 is attached is located in a bearing 14 formed in the upper part of a bracket 15, secured to the main frame 1. The upper part of the bracket 15 about the bearing 14 is cupped out so as to form a circular track 16 which lies in the same plane with the arm 6, which arm lies within this cupped-out portion, as shown in Fig. 4. Located in the lower side of the track 16 is a recess 17 into which the outer free end of the arm 6 normally lies, as shown in Fig. 2, the outer end of said arm being preferably provided with a friction roller 18. In this position of the parts the pawl 11, is out of engagement with the continuously rotating ratchet wheel so that the feed shaft is at rest.

Pivotally connected to an ear 19 on the underside of the track 16, adjacent the recess 17, is what I call a switch 20. Secured to the rock shaft 21, which extends transversely across the machine and has secured to one end thereof the levers 22 of the check row devices, in the usual way, is an arm 23, which extends beneath the switch 20, and normally lies in the position shown in Fig. 2, it being held in this position by a coil spring 24, connected at one end to an arm 25 secured to the shaft 21 and at the other end to an adjustable hook 26 extending through a perforated lug on the track 16 and arranged to be adjusted by a thumb-nut 27 to vary the tension of the spring. Whenever the shaft 21 is rocked by the check-row devices in the usual way, the arm 23, engaging the lower side of the switch 20, will throw the same up to the position shown in Fig. 3, which will rock the arm 6 and cause the pawl 11 to engage the teeth 4 of the continuously rotating ratchet wheel, whereupon the arm will be carried about the track, thereby imparting movement to the feed-shaft. So soon as the knot on the check wire has released the check-row lever, the rock shaft will be rocked back to its normal position by the spring 24, thereupon releasing the switch 20 and permitting it to drop back by gravity to the position shown in Fig. 2. So soon as the free end of the arm 6 reaches the opening or recess, it will drop into the same, thus freeing the pawl from the ratchet wheel and stopping the rotation of the feed shaft. By this operation it will be seen that there is imparted to the feed shaft one continuous revolution. By the construction described, it will be seen that the free end of the arm 6 will be assisted in dropping into the recess by centrifugal force, and this, in connection with gravity, will ordinarily be effective to cause the arm to drop into the recess. I have preferred, however, to employ a spring 28, shown in Fig. 6, interposed between the arm 6 and a lug 29 projecting from the collar 8; this spring acting in conjunction with gravity and centrifugal force to throw the arm into the recess, thus making a most effective construction.

By having the pawl and ratchet wheel so arranged that the pawl will engage the outer periphery of the wheel, instead of engaging teeth on the face or side of the wheel as in the old forms of constructions, all lateral strain is removed from the parts, such as the set-screws which hold the ratchet wheel and pawl arm in position.

For the purpose of drilling, I have provided means for holding the switch 20 in the position shown in Fig. 3 independent of the check-row devices, so as to close the recess and make a continuous track. Extending downwardly from the track on that side of the recess opposite the pivotal point for the switch 20 is an ear 30 having a perforation 31. The outer free end of the switch 20 is preferably bifurcated so as to straddle the ear 30 and this bifurcated portion is provided with perforations 32 adapted to register with the perforations 31 when the switch is in the position shown in Fig. 3. By inserting a cotter pin through the perforations the switch will be held in this position as long as desired. For this purpose the switch, adjacent the recess, is provided with a concave face 20$^a$, to conform to the curvature of the track.

Having thus described my invention, I claim:

1. In a clutch mechanism, a shaft, a continuously rotating ratchet wheel loose on said shaft having teeth on its outer periphery, a pawl arm connected with said shaft, a pawl on said pawl arm which stands in line with the teeth of said ratchet wheel, a circular track arranged about said pawl, said track having a recess to receive the free end of said pawl arm, and means for throwing said pawl into engagement with said ratchet wheel and to cause the pawl arm to travel around said track.

2. In a clutch mechanism, a shaft, a continuously rotating ratchet wheel loose on said shaft having teeth on its outer periphery, an arm pivotally connected with said shaft, a pawl on said arm, said pawl standing in line with the teeth of said wheel, a circular track arranged about said arm concentric with the axis of said shaft, said track having a recess to receive the outer end of said arm, and means for throwing said pawl into engagement with the teeth of said ratchet wheel and to cause the pawl arm to travel around said track.

3. In a clutch mechanism, a shaft, a continuously rotating ratchet wheel on said shaft having teeth on its outer periphery, a pawl arm pivotally connected with said shaft so as to swing in a direction at right-angles to the axis thereof, a pawl on said arm, means for swinging said arm to cause said pawl to engage with the teeth of said ratchet wheel, a circular track arranged about said arm to receive the free end thereof and hold said pawl in engagement with said wheel, and a recess in said track to receive the free end of said arm to permit its disengagement from said wheel.

4. In a clutch mechanism, a shaft, a continuously rotating ratchet wheel thereon, a swinging pawl arm pivoted to said shaft, a pawl on said arm to engage the teeth of said ratchet wheel, a circular track having a recess, the free end of said arm normally lying in said recess, a pivoted switch adjacent said recess, operating devices for projecting said switch into said recess to throw said pawl into engagement with said wheel and to cause said arm to travel around said track, and means independent of said operating devices for holding said switch in said recess.

5. In a clutch mechanism, a shaft, a continuously rotating ratchet wheel on said shaft having teeth on its outer periphery, a swinging pawl arm rotatably connected with said shaft, a pawl connected with said arm, a circular track arranged about said arm, said track having a recess, a spring normally holding the free end of said arm in said recess, and devices for projecting the free end of said arm out of said recess against the tension of said spring to cause said pawl to be thrown in engagement with said wheel and said arm to travel about said track.

6. In a clutch mechanism, a shaft, a continuously rotating ratchet wheel on said shaft, said wheel having teeth which project at right-angles to the axis of rotation of said wheel, a pawl arm pivoted to said shaft adapted to swing in a plane at right-angles to the axis of said shaft, a pawl on said arm, a circular track concentric with the axes of said wheel and shaft, said track having a recess in which the free end of said arm normally lies, and means for throwing said pawl arm onto said track to cause said pawl to engage with said ratchet wheel.

7. In a clutch mechanism, a shaft, a continuously rotating ratchet wheel on said shaft having teeth on its outer periphery, a pawl arm pivotally connected with said shaft, a pawl on said arm, a friction roller on the free end of said arm, a circular rim about said pawl arm, said rim having a recess to receive said friction roller, a pivoted switch adjacent said recess, said switch having a concave surface co-incident with said recess corresponding with the curvature of said rim, and devices for projecting the concave portion of said switch into said recess to throw said pawl into engagement with said ratchet wheel and said friction roller onto said circular rim, together with means for holding said switch in this position to cause said switch to form a continuation of said rim to provide a continuous track for said friction roller.

8. In a clutch mechanism, a shaft, a continuously rotating ratchet wheel on said shaft having teeth which project at right-angles to the axis of rotation of said wheel, a pawl arm pivotally connected with said shaft, a pawl on said arm, a circular track about said pawl arm, said track having a recess to receive the free end of said arm, a switch adjacent said recess, devices for temporarily projecting said switch into said recess to throw said pawl into engagement with the teeth of said ratchet wheel and the free end of said arm onto said track, together with means for permanently holding said switch in this position to cause said switch to form a continuation of said track.

In testimony whereof, I have hereunto set my hand this 10th day of August 1911.

FRANK R. PACKHAM.

Witnesses:
Roy H. Kipp,
Chas. I. Welch.

Copies of this patent may be obtained for five cents each, by addressing the "Commissioner of Patents, Washington, D. C."